Patented Jan. 25, 1938

2,106,597

UNITED STATES PATENT OFFICE 2,106,597

CATALYTIC MATERIAL AND PROCESS OF MAKING THE SAME

John S. Ferguson, Schenectady, N. Y., assignor to General Electric Company, a corporation of New York No Drawing. Application May 6, 1936, Serial No. 78,197

6 Claims. (Cl. 23—212)

This invention relates broadly to catalytic materials and to processes of making the same. More particularly it relates to active catalysts for chemical reactions made from metals and metallic compounds having inherent or latent catalytic activity. Although not limited thereto, and mentioned for illustrative purposes only, various types of the products of my invention have particular usefulness in such processes as the following: (1) production of hydrogen by the well-known water-gas reaction, $$CO + H_2O = CO_2 + H_2;$$

(2) decomposition of hydrocarbons with steam at elevated temperatures, e. g., decomposition of butane with steam at or near approximately 1100° C. in accordance with the following reaction, $C_4H_{10} + 4H_2O = 4CO + 9H_2$; (3) production of methane and other hydrocarbons from hydrogen and carbon monoxide; (4) oxidation of small amounts of carbon monoxide in the presence of hydrogen and carbon dioxide.

Substances that have been employed as catalysts in chemical reactions such as those hereinbefore given have been prepared only by arduous methods which were not infallible and were difficult to reproduce. Compounds of nickel, cobalt and iron have been used as starting materials, being subsequently activated by for example, the addition of other metals or metallic compounds such as chromium or vanadium or compounds thereof. A method of preparing cobalt and similar catalysts is described on page 95, vol. 34 (1934), of Industrial and Engineering Chemistry. Another method is described on page 513, vol. 18 (1926), of the same publication. In U. S. Patent 1,853,771 Larson discloses the preparation of active catalysts from activatable oxides and compounds thereof and, as a binding agent therefor, 10 per cent or less of a relatively plastic metal such as copper, lead, tin, iron or zinc.

Active catalysts for chemical reactions as heretofore made have been comparatively costly, not always of uniform quality, and with disadvantages in their use that are well known to those skilled in the art.

It is the broad object of the present invention to provide catalysts of improved properties and utility at a minimum cost. The scope of the invention includes both the processes of preparing such catalysts or contact bodies and the products thereof; and particularly a new and comparatively inexpensive process of increasing the catalytic activity or usefulness in chemical reactions of metals and metallic compounds having inherent or latent catalytic activity.

My invention provides uniform catalysts of high activity and otherwise of a quality acceptable as standard, or above standard, which catalysts function effectively at temperatures as low or lower than other catalysts of a similar or like chemical composition prepared by methods heretofore old in the art. It makes possible utilization, as starting materials, of the less costly technical or commercial grades of chemicals without preliminary chemical treatment. It provides a method whereby substantial quantities of catalysts may be made with comparatively inexpensive equipment and at a rate of production that is substantially more rapid and more economical than most commercial methods heretofore commonly used.

Briefly described, my invention comprises subjecting the starting substance to compression sufficient to disrupt and make catalytically active, or activatable upon subsequent treatment, parts thereof that have not been activated by any similar treatment heretofore known to the art. The compressed mass, which suitably may be in the form of bars, bricks, blocks or the like, or of any size, shape and form convenient to make and thereafter to handle and heat treat, then is subjected to a temperature substantially below its fusion point, that is to say, to a temperature below substantial fusion of it, for a period of time sufficiently long to effect the desired results. The immediately observed physical result of this heat treatment is a substantial hardening of the compressed mass, which prior to such treatment is comparatively soft. The compressed and heat-treated mass advantageously is crushed and screened to particles of the desired size, which in some cases may be used in that state as a contact body; or the sized particles subsequently may be subjected to the action of a reducing agent.

A more detailed description of the practicing of my invention follows:

I first select one or another, or two or more, of the substances heretofore known to the art as being suitable starting substances for the preparation of catalysts adapted for use in, for example, such processes as those hereinbefore mentioned. If the starting material is not already in a finely divided or powdered state, it is preferably reduced to such state. If the selected starting materials are two or more in number, they are very thoroughly and intimately admixed by any suitable means.

The finely divided substance is subjected to compression sufficient to alter, for example, to disrupt and make catalytically active (or activatable) parts thereof that heretofore have been considered to be relatively catalytically inactive. This compression treatment provides an increase in the catalytically active (or activatable) working area or total working surfaces of the substance in an amount equal to the catalytically active (or activatable) working area or total working surfaces of such disrupted parts. In other words, it effects a substantially increased actual or potential (or both actual and potential) surface energy of the total catalytically active (or activatable) working area of such working surfaces of the starting substance.

By the term "catalytically active (or activatable)" I mean that the matter to which reference is made in connection with a particular use of the term is then either catalytically active or is activatable upon subsequent treatment, or that a part of the matter is catalytically active and a part of it is activatable upon subsequent treatment. I use this term because I am unable to state with certainty at this time whether the compression treatment of the particular starting substance actually creates catalytic activity therein, or whether it effects such substance in a manner that my subsequent treatment develops the latent catalytic activity created by the prior treatment, or whether a part of the product of the compression treatment is catalytically active and a part of it is catalytically activatable (that is, may be made catalytically active by subsequent treatment).

I have successfully used pressures ranging from about 500 pounds to about 40,000 pounds per square inch and, for the most part, pressures ranging between about 10,000 and 30,000 pounds per square inch. The particular compression employed is dependent upon the particular starting substance and the particular properties desired in the end-product. Pressures above about 40,000 pounds per square inch may be used if desired, and in certain instances the use of such higher pressures may be either necessary or desirable.

In the preparation of catalysts of the kinds to which my invention is particularly directed, a compression of at least approximately 500 pounds per square inch to which I subject the starting substance is a critical pressure below which either partly processed products or end-products of improved properties, e. g., possessing a degree of hardness that is satisfactory and suitable from a commercial standpoint, are not obtained.

I may use any suitable means for subjecting the starting material to the desired pressure, e. g., a hydraulic press, extrusion mechanism, or any other device, apparatus or machine capable of exerting a pressure of at least approximately 500 pounds per square inch upon the material undergoing treatment. I may repeat the pressing operation any number of times required to obtain end-products that have the improved characteristics hereinbefore described.

Under certain conditions it may be advantageous to subject the starting material to a series of pressing operations at successively higher pressures, and such a method of treatment therefore is within the scope of my invention. For instance, I may subject the starting substance to a pressure of about 1,000 pounds per square inch, and immediately thereafter, or at any later time, I may subject said compressed substance to a substantially higher pressure, e. g., to a pressure ranging between about 24,000 and about 28,000 pounds per square inch. By such treatment a more gradual alteration or improvement of the inner structure of the substance thus treated may be effected.

In any case the compressed material is hardened by heating in the presence of air to a suitable temperature, which may vary somewhat depending upon the particular substance treated and the particular degree of compression employed, but which may be, for example, between about 500° and about 1100° C., and which is always substantially below the fusion point of the material.

The compressing and heat-treating steps hereinbefore described are steps essential for obtaining contact bodies or catalysts having a degree of hardness that is satisfactory and suitable from a commercial standpoint. I have found that the hardness of the end-product can be regulated or controlled to a considerable degree by changing the pressure to which the substance is subjected before the heat treatment.

Advantageously the compressed and heat-treated masses then are crushed and screened to the size desired, e. g., to such size that the smaller particles are retained on a U. S. Standard Sieve Series No. 14 sieve and most of the larger particles pass through a U. S. Standard 1-inch sieve. I have observed that crushing the compressed and heat-treated masses generally results in obtaining end-products that are catalytically more active and otherwise more satisfactory than end-products resulting from compressed and heat-treated masses, e. g., small pellets, that are not so crushed. This is probably due to the fact that crushing results in additional broken, ragged or disrupted grain boundaries, providing further atoms with "unsatisfied" energies, and therefore probably new catalytically active working surfaces, as well as an improvement or an increase in the surface energy of those surfaces which are already, in part at least, catalytically active. The crushing operation is therefore preferably carried out under conditions favorable to obtaining a maximum increase in the catalytically active working surfaces of said crushed substance.

From the crushing and screening operations there is obtained a certain amount, e. g., about 20 to 25 per cent, of finely divided material or dust. I have found that this dust may be mixed with fresh starting material and the whole subsequently processed in the same manner as herein described when using starting material that has not been partly processed. I have also found that this dust may be used by itself as starting material and reprocessed in substantially the same manner as herein set forth when using fresh starting material.

The material, either in the form of small uncrushed pellets or, advantageously, after having been crushed and sized, is placed in a catalyst chamber wherein it is subjected to the action of a reducing agent, e. g., the same gas-steam mixture ($H_2+CO+H_2O$) that is later used in the water-gas reaction, or hydrogen or carbon monoxide alone, or either hydrogen or carbon monoxide with steam.

The following examples will further illustrate how this invention may be carried out in practice, but the invention is not limited thereto.

*Example 1.*—Mix intimately about 70 parts by weight of powdered metallic copper with about 30 parts by weight of powdered cobalt oxide.

Subject the mixture to a pressure between about 10,000 and 30,000 pounds per square inch, e. g., about 20,000 pounds per square inch. A hydraulic press may be used, if desired, for this purpose and the mixture conveniently may be shaped in the form of bricks, blocks or bars weighing approximately several pounds each. Heat the bars at a suitable temperature, e. g., between about 500° and 1100° C., advantageously between about 650° and 800° C., for a period of time sufficiently long to obtain an end-product of optimum hardness. Usually, after the desired temperature has been reached, heating for approximately one-half to one hour at that temperature will produce the desired results. After cooling, crush the compressed and heat-treated masses by any suitable means and screen the crushed particles to the size desired. Place the sized material in a chamber, which advantageously may be the same one in which the material later can be used for the reaction without removal therefrom, and therein subject it to the action of a suitable reducing agent under such temperature and other conditions as are favorable to its reduction, e. g., at about 280° to about 340° C. with the same gas-steam mixture as is later used for the water-gas reaction. When the material has been almost but not quite completely reduced, or when it has been substantially completely reduced, it may be used as a catalyst. The end-product is characterized by its superior hardness and by its high catalytic activity when employed in processes involving the water-gas reaction.

*Example 2.*—Take 100 parts by weight of commercial cobalt oxide in powdered form and proceed as described under Example 1. This end-product, too, possesses superior hardness and a high degree of catalytic activity when employed in processes involving the water-gas reaction.

*Example 3.*—Mix intimately about 100 parts by weight of a commercial grade of powdered copper oxide and about 15 parts by weight of commercial cobalt oxide in powdered form, and proceed further as described under Example 1. Mixtures containing higher percentages of cobalt oxide than indicated above may be made if desired. The end-product is a comparatively inexpensive catalyst having a high degree of catalytic activity in processes involving the water-gas reaction.

Generally speaking, the use of an active catalyst made in accordance with my invention from a starting substance consisting of a mixture of powdered copper oxide and powdered cobalt oxide is preferred to an active catalyst made from cobalt oxide alone. This is because such a catalyst is practically as effective in the water-gas reaction as a catalyst made from cobalt oxide alone, and is much less costly due to the relative cheapness of powdered copper oxide as compared with powdered cobalt oxide. Further, with the application of substantially the same pressure and temperature treatment, the mixture of powdered copper oxide and powdered cobalt oxide results in obtaining an end-product that is apparently harder than one made from cobalt oxide alone, due possibly to the formation of copper cobaltite during the heat treatment.

I have further found that by using as starting substances metallic compounds, e. g., metallic oxides, alone or mixed with other metallic compounds such as metallic oxides, I am able to obtain end-products of greater porosity for the same given weight of end-product than I am able to obtain by using metals alone or mixed with other metallic compounds. The advantages that exist in catalysts having a high degree of porosity is well known to those skilled in the art.

*Example 5.*—Mix intimately about 50 parts by weight of powdered nickel oxide with about 50 parts by weight of powdered magnesium oxide. Subject the mixture to a pressure of about 30,000 pounds per square inch. Heat the compressed mass to a suitable temperature, e. g., about 800° C., and maintain it at that temperature for a suitable period of time, e. g., for from about one-half to about one hour. After cooling, crush and screen the heat-treated mass to particles of the desired size. Reduce the sized particles in situ to equilibrium with the mixture used for the conversion reaction and in the same temperature range as is used for the reaction. The end-product is a suitable catalyst for use in processes involving the preparation of methane from carbon monoxide and hydrogen. It may also be used for removing small amounts of carbon monoxide from gas mixtures containing the same by converting the carbon monoxide to methane.

*Example 6.*—Mix intimately approximately equal parts by weight of powdered ferric oxide, nickelous oxide and magnesium oxide, subject the mixture to a pressure of at least approximately 500 pounds per square inch, and advantageously to a pressure of about 20,000 pounds per square inch. The compressed mass is heat-treated at a suitable temperature, e. g., at about 1100° C. After cooling, it is crushed and screened to the desired size. The sized particles are then reduced with a suitable reducing agent, e. g., with hydrogen, or with a mixture of carbon monoxide and hydrogen. In the reduction treatment the nickelous oxide is reduced to nickel, or mostly so, the ferric oxide to lower oxides and probably also in part to metallic iron, while the magnesium oxide probably remains the same. The end-product is especially suitable for use in processes involving the decomposition of hydrocarbons (e. g., butane, propane) with steam at elevated temperatures.

Previous attempts to use a catalyst in a hydrogen producer, e. g., a so-called "Electrolene" producer of the kind or type described in U. S. Patent No. 1,953,047, operating upon such gases as butane and propane, have resulted in a rapid plugging of the catalyst with carbon, usually within about an hour after starting, so that operations could not be continued because of excessive back-pressure. With the catalyst described above, the pressure did not show any tendency to increase when making test runs of substantial duration. This catalyst was also successfully used in a new retort in an "Electrolene" producer, and gas of good quality was made from the start. Ordinarily, when using a new retort, several days are required in order to get the producer to work properly and the gas made during this period is of poor quality.

Although I do not wish to be limited by any theory of the mechanism of the process, it may be pointed out that numerous authorities consider catalytic activity to be due to certain activated atoms that are not in equilibrium with the surfaces by which they are held. By one or another of the compression, heat-treating and crushing steps employed in practicing my invention, or possibly by a combination of all of these steps or by any two of them, I believe that I effect a substantial physical change in the grain boundaries of the particles of the end-product. I also believe that the presence in the catalyst of ragged or broken or disrupted grain boundaries provides atoms with "unsatisfied" energies, that is, atoms not in equilibrium with the surfaces by which they are held and therefore active.

I further believe that when the substance is heat treated as hereinbefore described after subjecting to substantial compression, the particles of the substance form adhesions at the broken or ragged grain boundaries at temperatures below the fusion point, giving to the material, among other improved properties, a high degree of hardness; and that in addition, in at least certain cases, e. g., when the starting substance is a mixture of metallic compounds or metallic oxides, an actual chemical reaction takes place during the heat treatment and results in obtaining end-products of substantially improved properties.

Whatever the explanation, the fact remains that the practicing of my invention provides an economical process for producing catalysts of high catalytic activity and general utility, and with certain advantages in their use not possessed by any catalysts made by methods heretofore old in the art.

The term "catalyst" as used herein includes the contact mass in the form in which it is originally prepared in accordance with my invention, as well as in any modified form in which it may occur during its use.

What I claim as new and desire to secure by Letters Patent in the United States is:

1. An active catalyst for chemical reactions consisting of a sized mass of hard, porous particles of a reduction product having disrupted grain boundaries, said mass being the resultant of compressing, under a pressure of at least about 500 pounds per square inch, a substance comprising finally divided metallic oxide having inherent (latent) catalytic activity, then heating the compressed substance in an oxidizing atmosphere to a temperature of at least about 500° C. but below substantial fusion of said substance, then crushing and sizing the heat-treated substance, and finally chemically reducing the sized substance.

2. An active catalyst for producing hydrogen by the water-gas reaction consisting of a sized mass of hard, porous particles of a reduction product having disrupted grain boundaries, said mass being the resultant of compressing a mixture of powdered oxides of copper and cobalt under a pressure of between about 10,000 and about 30,000 pounds per square inch, then heating the compressed substance in air to a temperature of about 500° to 1100° C., then crushing and sizing the heat-treated substance, and finally reducing the sized substance practically completely to metallic state.

3. A process of making an active catalytic mass consisting of hard, porous particles of a reduction product having disrupted grain boundaries which consists in compressing, under a pressure of at least about 500 pounds per square inch, a substance comprising finally divided metallic oxide having inherent (latent) catalytic activity, then heating the compressed substance in an oxidizing atmosphere to a temperature of at least about 500° C. but below substantial fusion of said substance, then crushing and sizing the heat-treated substance, and finally chemically reducing the sized substance.

4. A process of making an active catalytic mass consisting of hard, porous particles of a reduction product having disrupted grain boundaries which consists in compressing a mixture of powdered oxides of copper and cobalt under a pressure of between about 10,000 and about 30,000 pounds per square inch, then heating the compressed substance in air to a temperature of about 500° to 1100° C., then crushing and sizing the heat-treated substance, and finally reducing the sized substance practically completely to metallic state.

5. A process for producing hydrogen which comprises reacting a gaseous mixture comprising carbon monoxide and water vapor at an elevated temperature in the presence of a catalyst comprising a sized mass of hard, porous particles of a reduction product having disrupted grain boundaries, said mass being the resultant of compressing, under a pressure of at least about 500 pounds per square inch, a substance comprising finally divided metallic oxide having inherent (latent) catalytic activity, then heating the compressed substance in an oxidizing atmosphere to a temperature of at least about 500° C. but below substantial fusion of said substance, then crushing and sizing the heat-treated substance, and finally chemically reducing the sized substance.

6. A process for producing hydrogen which comprises reacting a gaseous mixture containing substantial amounts of carbon monoxide and water vapor at an elevated temperature in the presence of a catalyst consisting of a sized mass of hard, porous particles of a reduction product having disrupted grain boundaries, said mass being the resultant of compressing a mixture of powdered oxides of copper and cobalt under a pressure of between about 10,000 and about 30,000 pounds per square inch, then heating the compressed substance in air to a temperature of about 500° to 1100° C., then crushing and sizing the heat-treated substance, and finally reducing the sized substance practically completely to metallic state.

JOHN S. FERGUSON.

CERTIFICATE OF CORRECTION.

Patent No. 2,106,597. January 25, 1938.

JOHN S. FERGUSON.

It is hereby certified that error appears in the printed specification of the above numbered patent requiring correction as follows: Page 4, first column, line 40, and second column, lines 6 and 34, claims 1, 3 and 5, respectively, for "finally" read finely; and that the said Letters Patent should be read with this correction therein that the same may conform to the record of the case in the Patent Office.

Signed and sealed this 8th day of March, A. D. 1938.

Henry Van Arsdale,
Acting Commissioner of Patents.

(Seal)